US012462252B2

(12) United States Patent
Chauhan et al.

(10) Patent No.: US 12,462,252 B2
(45) Date of Patent: Nov. 4, 2025

(54) METHODS AND SYSTEMS FOR SECURING TRANSACTIONS

(71) Applicant: Bank of America Corporation, Charlotte, NC (US)

(72) Inventors: Sandeep Kumar Chauhan, Hyderabad (IN); Ngoc Tran, Charlotte, NC (US); Maneesh Kumar Sethia, Hyderabad (IN); Saurabh Arora, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 69 days.

(21) Appl. No.: 18/229,703

(22) Filed: Aug. 3, 2023

(65) Prior Publication Data

US 2025/0045748 A1 Feb. 6, 2025

(51) Int. Cl.
*G06Q 20/40* (2012.01)
*G06Q 20/38* (2012.01)

(52) U.S. Cl.
CPC ....... *G06Q 20/401* (2013.01); *G06Q 20/3827* (2013.01)

(58) Field of Classification Search
None
See application file for complete search history.

(56) References Cited

U.S. PATENT DOCUMENTS 8,355,982 B2 * 1/2013 Hazel .................. G07G 3/003
    705/38
10,142,296 B2 * 11/2018 Salek .................. H04W 4/022
10,521,709 B2 * 12/2019 Koeppel ............. G06Q 20/3552
10,872,345 B1 * 12/2020 Walters .............. G06Q 20/4093
11,055,698 B2 * 7/2021 Taffer ................. G06Q 20/352
(Continued)

FOREIGN PATENT DOCUMENTS

AU    2013204744 A1 *  2/2014    ....... G06Q 20/40145
AU    2015201966 A1 *  5/2015
(Continued)

OTHER PUBLICATIONS

English language translation of CN-114881635-A: https://patents.google.com/patent/CN114881635A/en?oq=CN-114881635-A (Year: 2024).*
(Continued)

*Primary Examiner* — Ayal I. Sharon
(74) *Attorney, Agent, or Firm* — Weiss & Arons LLP

(57) ABSTRACT

An apparatus is provided, including a transaction card, having: a first microprocessor configured to exchange transaction data; a sensor configured to detect movement; and a second microprocessor in communication with the sensor. The second microprocessor may be configured to store arrays of hash values, representing a movement of a user and a card; obtain hash values based on observed movement patterns, and compare them to the stored values. Upon receiving a transaction request, the microprocessor may determine in real time whether the user is in locomotion and whether the card is being intentionally tapped by the user, based on the observed movement patterns. On this basis, the second microprocessor may determine whether to require an augmented authentication for the requested transaction.

10 Claims, 6 Drawing Sheets

(56) References Cited

U.S. PATENT DOCUMENTS

| | | | |
|---|---|---|---|
| 11,551,200 B1* | 1/2023 | Cook | G06Q 20/204 |
| 11,720,901 B2* | 8/2023 | Rule | G06T 7/70 |
| | | | 705/44 |
| 11,748,755 B2* | 9/2023 | Chauhan | G06Q 20/341 |
| | | | 705/44 |
| 12,182,204 B2* | 12/2024 | Tran | G06Q 20/18 |
| 2007/0259717 A1 | 11/2007 | Mattice et al. | |
| 2013/0024375 A1 | 1/2013 | Choudhuri et al. | |
| 2017/0026345 A1* | 1/2017 | Salek | H04W 12/033 |
| 2017/0323166 A1 | 11/2017 | Colussi et al. | |
| 2019/0080072 A1 | 3/2019 | Van Os et al. | |
| 2020/0186355 A1* | 6/2020 | Davies | G06Q 40/02 |
| 2021/0241284 A1* | 8/2021 | Walters | G06Q 20/202 |
| 2021/0256070 A1* | 8/2021 | Tran | G06Q 20/18 |
| 2021/0374391 A1 | 12/2021 | Jorasch et al. | |
| 2022/0239493 A1* | 7/2022 | Walters | H04L 63/0442 |
| 2022/0405762 A1* | 12/2022 | Walters | G06N 20/00 |
| 2023/0034821 A1* | 2/2023 | Chauhan | G06Q 20/4014 |
| 2023/0086442 A1* | 3/2023 | Van Ostrand | G06F 3/04166 |
| | | | 345/173 |
| 2023/0196375 A1* | 6/2023 | Ridzuan Bin Ma Arof | H04L 63/0838 |
| | | | 705/44 |
| 2023/0289786 A1* | 9/2023 | Lee | G06Q 20/401 |

FOREIGN PATENT DOCUMENTS

| | | | | |
|---|---|---|---|---|
| CA | 3212982 A1 | * | 9/2022 | G06Q 40/04 |
| CN | 109670820 A | * | 4/2019 | G06Q 20/354 |
| CN | 114881635 A | * | 8/2022 | |
| EP | 3278537 B1 | * | 1/2020 | G06F 21/6254 |
| WO | WO-2017077337 A1 | * | 5/2017 | G06Q 20/3223 |

OTHER PUBLICATIONS

Wikipedia: Edge Computing, https://en.wikipedia.org/wiki/Edge_computing. Dated Jul. 31, 2025 (Year: 2025).*

Google Patents English language translation of CN-109670820-A. https://patents.google.com/patent/CN109670820A/en?oq=CN-109670820-A (Year: 2019).*

* cited by examiner

METHODS AND SYSTEMS FOR SECURING TRANSACTIONS

FIELD OF TECHNOLOGY

Aspects of the disclosure relate to methods and systems for securing transactions. The transaction attempts may utilize card tapping. The methods and systems are intended to distinguish between intentional card tapping by the owner and fraudulent tapping, for example by a fraudster.

BACKGROUND OF THE DISCLOSURE

Financial institutions expend considerable resources and expenses on combatting fraud, including blocking and unblocking cards and tracing back transactions to obtain refunds. Besides classical transactional frauds, credit and debit cards may be vulnerable to skimming or tapping by fraudsters. While contactless cards may provide a convenient payment method that does not require a PIN code, criminals may possess devices designed to make contactless payments on cards carried inside a purse or wallet.

Verifying card-based payments in real-time is technically challenging. Tapping card transactions may typically take only about 2 seconds to process, providing a very short window for identifying and blocking fraudulent transactions. It is neither practical nor desirable to require 2-step verification or other augmented authentication protocols every time a transaction request is processed. Solutions to address these issues fraudulent payments are urgently needed.

SUMMARY OF THE DISCLOSURE

It is an object of this invention to distinguish between intentional card tapping by the owner and fraudulent tapping.

It is a further object of this invention to provide a real-time solution to enhance security of card tapping transactions.

It is a further object of this invention to reduce the burden placed on financial institutions by fraudulent card tapping transactions.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically compare observed card movement patterns with a database of stored movement patterns, and perform various other activities, as described herein.

An apparatus for securing a transaction is provided. The apparatus may include a transaction card. The transaction card may include a first microprocessor configured to exchange transaction data to effect a transaction. The transaction may be at a point of sale. The first microprocessor may engage with a transacting party.

The transaction card may include a sensor configured to detect movement of the card.

The transaction card may include a second microprocessor in electrical communication with the sensor. The second microprocessor may be configured to store a first array of hash values and a second array of hash values. The first array of hash values may represent a movement of a user in possession of the transaction card. The second array of hash values may represent a purposeful movement of the transaction card relative to the user.

The second microprocessor may be configured to derive a series of observed patterns. Each pattern may be associated with an observation time range. Each pattern may be based on a transformation of a time series of signals output by the sensor. The transformation may be based on a relationship between the time series and a measurement of a parameter. The parameter may be selected from acceleration and angular orientation.

The second microprocessor may be configured to convert the observed patterns into a third array of hash values.

The second microprocessor may be configured to store the third array of hash values or a subset thereof in a working memory.

The second microprocessor may be configured to register a request from the first microprocessor to effect a requested transaction. The second microprocessor may be configured to register a transaction request time corresponding to the time of the transaction request.

The second microprocessor may be configured to identify a contemporaneous hash value from the third array of hash values. The contemporaneous hash value may be contemporaneous with the transaction request time.

The second microprocessor may be configured to determine in real time whether the contemporaneous hash value matches a hash value from the first array or the second array.

The second microprocessor may be configured to require an augmented authentication for the requested transaction. The augmented authentication may be based on at least one of the following conditions: (a) the contemporaneous hash value matches a hash value from the first array; and/or the contemporaneous hash value does not match any of the hash values in the second array.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
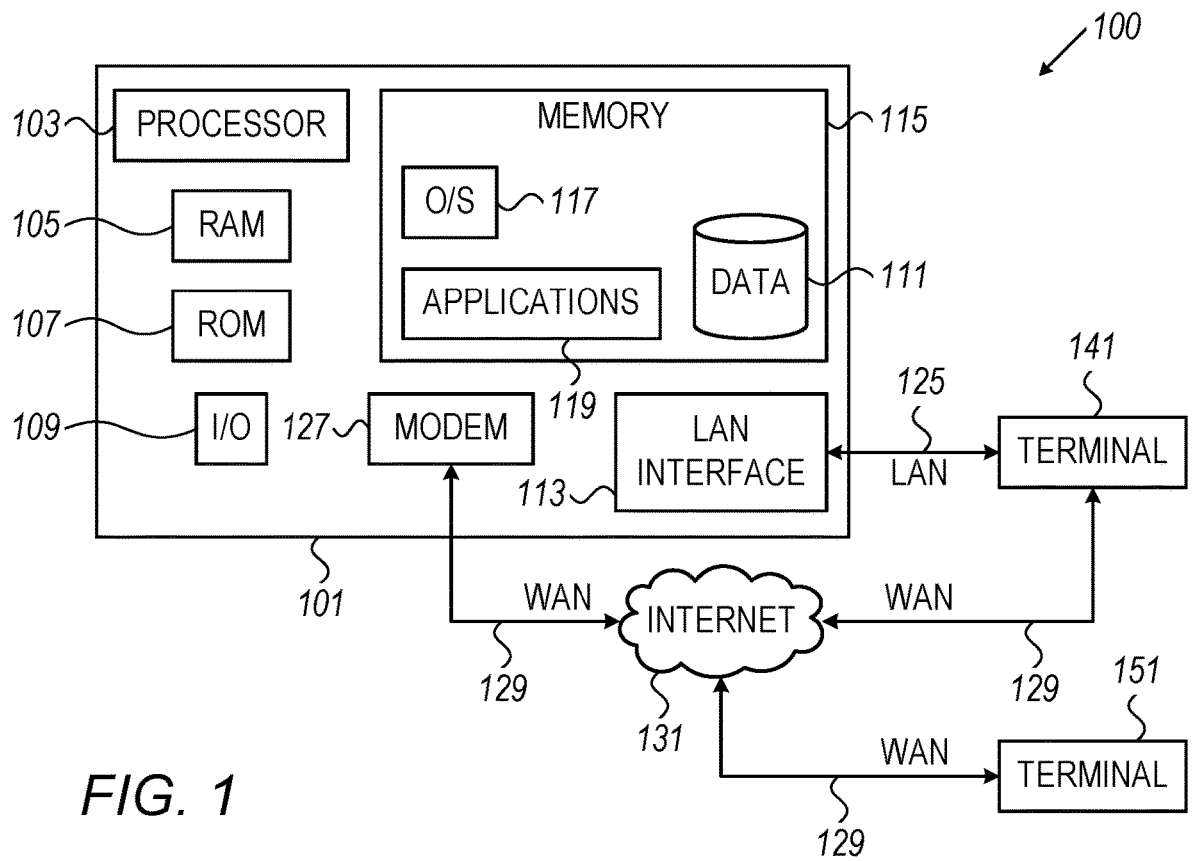
FIG. 1 shows an illustrative system in accordance with principles of the disclosure.

A method in accordance with principles of the disclosure may facilitate real-time identification and blocking of fraudulent card-based transactions.

Embodiments of the system, as described herein, may leverage edge processing, and/or other complex, specific-use computer systems to provide a novel approach for identifying and blocking fraudulent card-based transactions.

As such, aspects of the present disclosure provide a technical solution to a technical problem of preventing card transaction fraud.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically compare observed card movement patterns with a database of stored movement patterns, and perform various other activities, as described herein.

An apparatus for securing a transaction is provided in accordance with principles of the disclosure. The apparatus may include a transaction card. The transaction card may include a first microprocessor configured to exchange transaction data to effect a transaction. The transaction may be at a point of sale. The first microprocessor may engage with a transacting party.

The transaction card may include a sensor configured to detect movement of the card. The sensor may be mounted on the card.

The transaction card may include a second microprocessor that is in electrical communication with the sensor. The second microprocessor may be configured to store a first array of hash values and a second array of hash values. The first array of hash values may represent a movement of a user in possession of the transaction card. The first array may represent reference body movements.

The term body movement, as used herein, may include routine movements. The movements may include locomotion. The movements may include walking. The movements may include running. The movements may include working. The movements may include other routine behaviors. Body movement may exclude purposeful movement of the card. Purposeful movement of the card may encompass moving the card to execute a tapping transaction.

The term reference body movements, in this regard, may refer to a set of stored body movements intended to serve as a basis for comparison vis-à-vis later "observed" movements. Reference body movements may be performed and recorded prior to use of the system to help authenticate a transaction. Reference body movements may be executed and recorded by the described systems while the system or device is in storing mode. Reference body movements may be based on body movements recorded from a representative sample of users.

Observed body movements may have been performed close to the time of attempting a transaction. Observed body movements may be executed and recorded while the system or device is in monitoring mode. The described systems and methods may monitor card movements on an ongoing basis. Card movements may generate a live feed. Card movements may be converted to hash values and stored in the second processor in real-time. The system may have a lag time of less than seconds for converting card movements to hash values and storing them in the second processor. The conversion may utilize a one-way hashing algorithm.

The second array of hash values may represent a purposeful movement of the transaction card relative to the user. The second array may represent reference relative card movements.

The second microprocessor may be configured to derive a pattern from observed movement. The second microprocessor may be configured to encode the pattern in a hash that may be referred to as an "observed" hash. The second microprocessor may be configured to initiate an augmented authentication. An augmented authentication may include an additional authentication not included in a routine transaction. A transacting party may communicate to the first microprocessor a request corresponding to the augmented authentication.

Table 1 lists illustrative transacting parties.

TABLE 1

| Illustrative transacting parties |
| --- |
| Electronic payment platform |
| Financial institution |
| Private enterprise (e.g., in the context of a time and attendance platform) |
| A security party (e.g., in the context of perimeter security, authorization for admission into interior of perimeter |
| User |
| Other suitable parties |

The term reference card movements, in this regard, may refer to a set of stored card movements intended to serve as a basis for comparison vis-à-vis later "observed" movements. Observed card movements may be performed close to the time of attempting a transaction. Observed card movements may be executed and recorded while the system or device is in monitoring mode. By contrast, reference card movements may be performed and recorded prior to use of the system to help authenticate a transaction. Reference card movements may be executed and recorded by the described systems while the system or device is in storing mode. Reference card movements may be based on card movements recorded from a representative sample of users.

The second microprocessor may be configured to derive a series of observed patterns. Each pattern may be associated with an observation time range. Each pattern may be based on a transformation of a time series of signals output by the sensor. The transformation may be based on a relationship between the time series and a measurement of a parameter. The parameter may be selected from acceleration and angular orientation. Each pattern may be based on the disposition of the sensor at a location on the card. Each pattern may reflect the movement of the card. Each pattern may reflect a change in the angular orientation of the card. Movements of the card and/or changes in its angular orientation may be composites of locomotion and other movement of the card holder's body and movement of the card relative to the card holder.

The second microprocessor may be configured to convert the observed patterns into a third array of hash values. The conversion may utilize a one-way hashing algorithm.

The second microprocessor may be configured to store the third array of hash values or a recent subset thereof in a working memory. A recent subset may refer to hash values converted from patterns observed over the last 30 seconds. A recent subset may refer to values converted from patterns from the last 2 minutes. A recent subset may refer to values converted from patterns from the last 5 minutes. A recent subset may refer to values converted from patterns from the last 10 minutes. The term may refer to values corresponding to patterns observed over at least 30 seconds, at least 1 minute, at least 2 minutes, at least 3 minutes, at least 5 minutes, or at least 10 minutes prior to the time of storing the values. The term may refer to values corresponding to patterns observed not more than one hour prior to the time of storing the values.

The patterns described herein may be based on a transformation of a time-series. The transformation may include a derivative of the time-series. The derivative may be a temporal derivative. The derivative may be a spatial derivative.

The second microprocessor may be configured to register a request from the first microprocessor to effect a requested transaction. The second microprocessor may be configured to register a transaction request time corresponding to the time of the transaction request.

The second microprocessor may be configured to identify a contemporaneous hash value from the third array of hash values. The contemporaneous hash value may be contemporaneous with the transaction request time. A contemporaneous hash value may refer to a value corresponding to motion within about one second prior to the transaction request time. A contemporaneous hash value may refer to a value corresponding to motion within about 0.5 seconds prior to the transaction request time. A contemporaneous hash value may refer to a value corresponding to motion within about 2 seconds prior to the transaction request time.

The second microprocessor may be configured to determine in real time whether the contemporaneous hash value matches a hash value from the first array or the second array.

The second microprocessor may be configured to require an augmented authentication for the requested transaction. The augmented authentication may be based on a match between the contemporaneous hash value with at least one hash value from the first array. The augmented authentication may be based on a mismatch between the contemporaneous hash value and all the hash values in the second array. Requiring the augmented authentication may be predicated on meeting at least one of the following conditions: (a) the contemporaneous hash value matches a hash value from the first array; and/or (b) the contemporaneous hash value does not match any of the hash values in the second array. An augmented authentication requirement may prevent system integration before additional user verification is completed.

A method for securing a transaction is provided in accordance with principles of the disclosure. The method may include a transaction card. The transaction card may include a first microprocessor. The first microprocessor may exchange transaction data to effect a transaction. The transaction may be at a point of sale. The first microprocessor may engage with a transacting party.

The transaction card may include a sensor. The sensor may detect movements of the card. The sensor may be mounted on the card.

The transaction card may include a second microprocessor that is in electrical communication with the sensor. The second microprocessor may store a first array of hash values and a second array of hash values. The first array of hash values may represent a movement of a user in possession of the transaction card. The first array may represent reference body movements.

The second array of hash values may represent a purposeful movement of the transaction card relative to the user. The second array may represent reference relative card movements.

The second microprocessor may derive a pattern from observed movement. The second microprocessor may encode the pattern in a hash that may be referred to as an "observed" hash. The second microprocessor may initiate an augmented authentication. An augmented authentication may include an additional authentication not included in a routine transaction. A transacting party may communicate to the first microprocessor a request corresponding to the augmented authentication.

The second microprocessor may derive a series of observed patterns. Each pattern may be associated with an observation time range. Each pattern may be based on a transformation of a time series of signals output by the sensor. The transformation may be based on a relationship between the time series and a measurement of a parameter. The parameter may be selected from acceleration and angular orientation. Each pattern may be based on the disposition of the sensor at a location on the card. Each pattern may reflect the movement of the card. Each pattern may reflect a change in the angular orientation of the card. Movements of the card and/or changes in its angular orientation may be composites of locomotion and other movement of the card holder's body and movement of the card relative to the card holder.

The second microprocessor may convert the observed patterns into a third array of hash values. The conversion may utilize a one-way hashing algorithm.

The second microprocessor may store the third array of hash values or a recent subset thereof in a working memory. A recent subset may refer to hash values converted from patterns observed over the last 30 seconds. A recent subset may refer to values converted from patterns from the last 2 minutes. A recent subset may refer to values converted from patterns from the last 5 minutes. A recent subset may refer to values converted from patterns from the last 10 minutes. The term may refer to values corresponding to patterns observed over at least 30 seconds, at least 1 minute, at least 2 minutes, at least 3 minutes, at least 5 minutes, or at least 10 minutes prior to the time of storing the values. The term may refer to values corresponding to patterns observed not more than one hour prior to the time of storing the values.

The second microprocessor may register a request from the first microprocessor to effect a requested transaction. The second microprocessor may register a transaction request time corresponding to the time of the transaction request.

The second microprocessor may identify a contemporaneous hash value from the third array of hash values. The contemporaneous hash value may be contemporaneous with the transaction request time.

The second microprocessor may determine in real time whether the contemporaneous hash value matches a hash value from the first array or the second array.

The second microprocessor may require an augmented authentication for the requested transaction. The augmented authentication may be based on a match between the contemporaneous hash value with at least one hash value from the first array. The augmented authentication may be based on a mismatch between the contemporaneous hash value and all the hash values in the second array. Requiring the augmented authentication may be predicated on meeting at least one of the following conditions: (a) the contemporaneous hash value matches a hash value from the first array; and/or (b) the contemporaneous hash value does not match any of the hash values in the second array. An augmented authentication requirement may prevent system integration before additional user verification is completed.

The second array of hash values may be personalized for the transaction card's owner or an authorized user. A personalized array of hash values, based on purposeful movement of the card by the owner or authorized user, may be obtained by setting the card to storing mode. During storing mode, the second microprocessor may communicate with the sensor to receive movement patterns of the card by the owner or authorized user. The microprocessor may record the movement patterns, convert the movement patterns into hash values, and store the hash values. The hash values may be stored as a set. During storing mode, the microprocessor may create and store hash values corresponding to patterns generated by behaviors of an authorized user while the authorized user is in possession of transaction card. The behaviors may include intentionally tapping the card at a transaction station. The behaviors may include intentionally tapping the card at a mock transaction station. The behaviors may include swiping the card at a magnetic card reader. The behaviors may include swiping the card at a mock card reader. The mock card reader or transaction station may be utilized for purposes of training the system.

The second array of hash values may be not personalized for the transaction card's owner. The second array of hash values may be not specific to the transaction card's owner. The second array of hash values may be a general array of values reflecting card tapping motions of an average user. The second array of hash values may be a general array of values reflecting card tapping motions of a typical user. A personalized array of hash values, based on purposeful movement of the card by an average, or typical, user, may be obtained by recording movement patterns of the card by a representative sample of users, converting the movement patterns into hash values, and storing the hash values. The hash values may be stored as a set. The described second microprocessor may store hash values corresponding to patterns generated by behaviors of an average user while the user is in possession of transaction card. The behaviors may include intentionally tapping the card at a transaction station. The behaviors may include intentionally tapping the card at a mock transaction station. The behaviors may include swiping the card at a magnetic card reader. The behaviors may include swiping the card at a mock card reader. The mock card reader or transaction station may be utilized for purposes of training the system.

The first array of hash values may be personalized for the transaction card's owner. A personalized array of hash values, based on the movement of an authorized user in possession of the card, may be obtained by setting the card to storing mode. During storing mode, the microprocessor may record movement patterns of the card while being carried by an authorized user, convert the movement patterns into hash values, and store the hash values. The hash values may be stored as a set. During storing mode, the microprocessor may create and store hash values corresponding to patterns generated by behaviors of an authorized user while the authorized user is in possession of transaction card. The behaviors may include routine movement. The movement may include locomotion. The movement may include walking. The movement may include running. The movement may include working. The movement may include other routine behaviors.

The second microprocessor may be configured to store a fourth array of hash values. The fourth array of hash values may represent the body movements of a user other than the owner. The fourth array of hash values may be not personalized for the transaction card's owner. The fourth array of hash values may be not specific to the transaction card's owner. The fourth array of hash values may be a general array of values reflecting movement patterns of the card while being carried by an average user. The second array of hash values may be a general array of values reflecting movement patterns of the card while being carried by a typical user. A general array of hash values, based on body movements by an average, or typical, user, may be obtained by recording movement patterns of the card while being carried by a representative sample of users, converting the movement patterns into hash values, and storing the hash values. The hash values may be stored as a set. The described second microprocessor may store hash values corresponding to patterns generated by behaviors of an average user while the user is in possession of transaction card. The behaviors may include routine movement. The movement may include locomotion. The movement may include walking. The movement may include running. The movement may include working. The movement may be selected from walking, running, and working. The movement may include other routine behaviors.

The second microprocessor may be configured to periodically compare a hash value from the third array of hash values to the values from the first and fourth arrays of hash values. The hash value from the third array of may be a recent value. In the case of a personalized first array, comparing the third array values to the first array values may assess whether the current card holder is believed to be a previously authorized and validated user. Sufficient similarity between a recently observed value from the third array and at least one value from the first array may be taken as evidence that the authorized user is in possession of the card. A recent value, in this context, may refer to one or more hash values converted from patterns observed over the last 2 minutes. A recent value may refer to value(s) converted from patterns from the last 3 minutes. A recent value may refer to value(s) converted from patterns from the last 5 minutes. A recent value may refer to value(s) converted from patterns from the last 10 minutes. A recent value may refer to value(s) converted from patterns from the last 20 minutes. The term may refer to value(s) corresponding to patterns observed over at least 2 minutes, at least 3 minutes, at least 5 minutes, at least 10 minutes, at least 20 minutes, or at least 30 minutes prior to the time of comparing the values from the third array of hash values to those from the first and fourth arrays. The term may refer to value(s) corresponding to patterns observed not more than 1 hour prior to the time of comparing the values from the third array of hash values to those from the first and fourth arrays.

Reference herein to periodic comparison may refer to a comparison performed once per predetermined time period. The predetermined time period may range from 1-10 minutes. The time period may range from 1-15 minutes. The time period may range from 1-20 minutes. The time period may range from 1-30 minutes. The time period may range from 5-30 minutes. The time period may range from 5-60 minutes.

Comparing the third array values to the fourth array values may assess whether the current card holder is performing a routine activity. The activity may include locomotion. The activity may include walking. The activity may include running. The activity may include working. The movement may be selected from walking, running, and working. The activity may include other routine behaviors. Sufficient similarity between a recently observed value from the third array and at least one value from the fourth array may be taken as evidence that the card holder is performing a routine activity. If the current card holder is assessed to be performing a routine activity, but the movement patterns do not match the stored movement patterns for that activity, the card may be assessed to be in the possession of a non-authorized user. The stored motion patterns for the observed activity may be those in the first array of hash values.

The second microprocessor may be configured to set a flag to be applied when the card is used at a point of sale. The use may be for a transaction. The flag may require an augmented authentication to be conducted before the transaction is approved. The flag may require an augmented authentication to be conducted before the payment is authorized. The flag may require an augmented authentication to be conducted before the performing system integration. The augmented authentication may be readied prior to the transaction.

The flag may be based on no match being present between the recent hash value from the third array and any value from the first array. The flag may be based on a match between the recent hash value from the third array and at least one value from the fourth array. Setting the flag may be predicated on meeting of the following conditions: (a) a mismatch between the recent hash value from the third array and all the hash values from the first array; and (b) a match between the recent hash value from the third array and at least one value from the fourth array.

The first array of hash values may be not personalized for the transaction card's owner. The first array of hash values may be not specific to the transaction card's owner. The first array of hash values may be a general array of values reflecting routine movements of an average user. The first array of hash values may be a general array of values reflecting routine movements of a typical user. A general array of hash values, based on routine movements by an average, or typical, user, may be obtained by recording movement patterns of the card while being carried by a representative sample of users, converting the movement patterns into hash values, and storing the hash values. The hash values may be stored as a set. The described second microprocessor may store hash values corresponding to patterns generated by behaviors of an average user while the user is in possession of transaction card. The behaviors may include routine movement. The movement may include locomotion. The movement may include walking. The movement may include running. The movement may include working. The movement may be selected from walking, running, and working. The movement may include other routine behaviors.

The described second microprocessor may be the first microprocessor. A single microprocessor may be configured to perform the activities described herein for both the first and second microprocessors.

The described sensor may include an accelerometer. The described sensor may include a gyroscope. The described sensor may include an accelerometer and a gyroscope.

A system for securing a transaction is provided, in accordance with principles of the disclosure. The system may include a transaction card. The system may include a first sensor external to the transaction card. The transaction card may include a second sensor. The first sensor may be configured to detect movement of a person in possession of the transaction card. The second sensor may be configured to detect movement of the transaction card. The second sensor may be mounted on the card.

The transaction card may include a first microprocessor configured to exchange transaction data to effect a transaction by engagement of the first microprocessor with a transacting party. The transaction may be effected at a point of sale.

The transaction card may include a second microprocessor in electrical communication with the first and second sensors.

The second microprocessor may be configured to store a first and second array of reference hash values. The first array may represent reference body movements. The first array of hash values may represent a movement of a user in possession of the transaction card.

The term reference body movements, in this regard, may refer to a set of stored body movements intended to serve as a basis for comparison with later ("observed") movements. Observed body movements may be performed close to the time of attempting a transaction. Observed body movements may be executed and recorded while the system or device is in monitoring mode. By contrast, reference body movements may be performed and recorded prior to use of the system to aid in authenticating a transaction. Reference body movements may be executed and recorded by the described systems while the system or device is in storing mode. Reference body movements may be based on body movements observed with a representative sample of users.

The second array may represent reference relative card movements. The second array of hash values may represent a purposeful movement of the transaction card relative to the user.

The term reference card movements, in this regard, may refer to a set of stored card movements intended to serve as a basis for comparison with later ("observed") movements. Observed card movements may be performed close to the time of attempting a transaction. Observed card movements may be executed and recorded while the system or device is in monitoring mode. By contrast, reference card movements may be performed and recorded prior to use of the system to aid in authenticating a transaction. Reference card movements may be executed and recorded by the described systems while the system or device is in storing mode. Reference card movements may be based on card movements observed with a representative sample of users.

The second microprocessor may be in communication with the first and second sensors.

The second microprocessor may be configured to derive from the first sensor a series of observed body movement patterns. Each pattern may be associated with an observation time range and based on (a) a transformation of a time series of signals output by the sensor, the transformation based on a relationship between the time series and a measurement of a parameter selected from acceleration and angular orientation; and (b) the disposition of the first sensor at a location on the person.

The second microprocessor may be configured to convert the series of observed body movement patterns into a third array of hash values. The conversion may utilize a one-way hashing algorithm.

The second microprocessor may be configured to derive from the second sensor a series of observed card movement patterns. Each pattern may be associated with an observation time range and based on (a) a transformation of a time series of signals output by the first sensor, the transformation based on a relationship between the time series and a measurement of a parameter selected from acceleration and angular orientation; and (b) the disposition of the second sensor at a location on the card.

The second microprocessor may be configured to compare the series of observed card movement patterns to contemporaneous observed patterns from the series of observed body movement patterns to thereby derive a series of observed relative card movement patterns. The relative card movement patterns may be relative to the person's torso. The relative card movement patterns may be relative to the person's legs. Contemporaneous, in this context, may refer to a body movement pattern observed within 0.2 seconds of the card movement pattern. Contemporaneous may refer to a body movement pattern observed within 0.1 seconds of the card movement pattern.

By way of example, body movement patterns may be identical to card movement patterns. The first and second sensors may register identical acceleration at a given time point X. At time point X, the card may be considered as not moving relative to the card holder's torso. At time point X, the card may be considered as not moving relative to the card holder's legs. At time point Y, the first sensor may register no acceleration, and the second sensor may register an acceleration of 1 meter per second per second ($m/s^2$). At time point Y, the card may be considered as accelerating at 1 $m/s^2$ relative to the card holder's torso. At time point Y, the card may be considered as accelerating relative to the card holder's legs.

The second microprocessor may be configured to convert the series of observed relative card movement patterns into a fourth array of hash values.

The second microprocessor may be configured to store the third and fourth arrays of hash values or a recent subset thereof in a working memory. A recent subset may refer to hash values derived from patterns observed over the last 30 seconds. A recent subset may refer to values derived from patterns observed over the last 2 minutes. A recent subset may refer to values derived from patterns observed over the last 5 minutes. A recent subset may refer to values derived from patterns observed over the last 10 minutes. The term may refer to values corresponding to patterns observed at least 30 seconds, at least 1 minutes, at least 2 minutes, at least 3 minutes, at least 5 minutes, or at least 10 minutes before the time that the working memory is refreshed. The term may refer to values corresponding to patterns observed not more than one hour before the time of refreshing the working memory.

The second microprocessor may be configured to register (a) a request from the first microprocessor to effect a requested transaction and (b) a corresponding transaction request time.

The second microprocessor may be configured to identify a first contemporaneous hash value from the third array of hash values. The contemporaneous hash value may be contemporaneous with the transaction request time.

The second microprocessor may be configured to identify a second contemporaneous hash value from the fourth array of hash values. The contemporaneous hash value may be contemporaneous with the transaction request time.

The second microprocessor may be configured to determine in real time whether the first contemporaneous hash value matches a hash value from the first array.

The second microprocessor may be configured to determine in real time whether the second contemporaneous hash value matches a hash value from the second array.

The second microprocessor may be configured to require an augmented authentication for the requested transaction. The augmented authentication may be required if the first contemporaneous hash value matches a hash value from the first array. A match between the first contemporaneous hash value and a hash value from the first array may be taken as evidence that the card owner was walking at the time of the transaction request. A match between the first contemporaneous hash value and a hash value from the first array may be taken as evidence that the card owner was locomoting at the time of the transaction request.

Augmented authentication may be required if the second contemporaneous hash value does not match any of the hash values in the second array. A mismatch between the second contemporaneous hash value and all of the hash values in the second array may be taken as evidence that card was not being purposefully tapped in a legitimate manner.

Augmented authentication may be required if at least one of the previous 2 conditions is met, namely that (a) the first contemporaneous hash value matches a hash value from the first array; and/or the second contemporaneous hash value does not match any of the hash values in the second array.

In some embodiments, the first sensor may be disposed in a mobile computing device. The first sensor may be mounted on the mobile device. The sensor may interface with a mobile application on the mobile device. The mobile application may direct operation of the third sensor. The mobile application may include a third microprocessor. The third microprocessor may convert the observed movement patterns to hash values. The mobile application may transmit the hash values to the second application. The third microprocessor may transmit the hash values to the second application. The mobile application may be in communication with the second microprocessor on the card. The mobile application may be configured to communicate with the second microprocessor on the card to enable the described systems and methods. The mobile application may mediate communication between the first sensor and the second microprocessor.

The second array of hash values may be personalized for the transaction card's owner or an authorized user. A personalized array of hash values, based on purposeful movement of the card by the owner or authorized user, may be obtained by setting the card to storing mode. While in storing mode, the second microprocessor may communicate with the first and second sensors to receive (a) movement patterns of the body of an owner or authorized user and (b) movement patterns of the card while in possession of the owner or authorized user. The microprocessor may compare the card movements to the body movements to derive the relative position of the card compared to the body.

The second microprocessor may record the relative movement patterns of the card by the owner or authorized user, convert the movement patterns into hash values, and store the hash values. The hash values may be stored as a set. While in storing mode, the microprocessor may create and store hash values corresponding to patterns generated by behaviors of an authorized user while the authorized user is in possession of transaction card. The behaviors may include intentionally tapping the card at a transaction station. The behaviors may include intentionally tapping the card at a mock transaction station. The behaviors may include swiping the card at a magnetic card reader. The behaviors may include swiping the card at a mock card reader. The mock card reader or transaction station may be utilized for purposes of training the system.

The second array of hash values may be not personalized for the transaction card's owner. The second array of hash values may be not specific to the transaction card's owner. The second array of hash values may be a general array of values reflecting card tapping motions of an average user. The second array of hash values may be a general array of values reflecting card tapping motions of a typical user. A general array of hash values, based on purposeful movement of the card by an average, or typical, user, may be obtained by recording relative movement patterns of the card by a representative sample of users, where relative refers to movements of the card relative to the user's body. Next, a processor may convert the relative movement patterns into hash values. The hash values may be stored as a set on the described second microprocessor. The hash values may be stored as a set in the memory of the described second microprocessor. The second microprocessor may store hash values corresponding to patterns generated by behaviors of an average user while the user is in possession of transaction card. The behaviors may include intentionally tapping the card at a transaction station. The behaviors may include intentionally tapping the card at a mock transaction station. The behaviors may include swiping the card at a magnetic card reader. The behaviors may include swiping the card at a mock card reader. The mock card reader or transaction station may be utilized for purposes of training the system.

The first array of hash values may be personalized for the transaction card's owner. A personalized array of hash values, based on the movement of an authorized user in possession of the card, may be obtained by setting the card to storing mode. While in storing mode, the microprocessor may record movement patterns of the card while being carried by an authorized user, convert the movement patterns into hash values, and store the hash values. The hash values may be stored as a set. While in storing mode, the microprocessor may create and store hash values corresponding to patterns generated by behaviors of an authorized user while the authorized user is in possession of transaction card. The behaviors may include routine movement. The movement may include locomotion. The movement may include walking. The movement may include running. The movement may include working. The movement may include other routine behaviors.

The second microprocessor may be configured to store a fifth array of hash values. The fifth array of hash values may represent the body movements of a user other than the owner. The fifth array of hash values may be not personalized for the transaction card's owner. The fifth array of hash values may be not specific to the transaction card's owner. The fifth array of hash values may be a general array of values reflecting movement patterns of the card while carried by an average user. The fifth array of hash values may be a general array of values reflecting movement patterns of the card while carried by a typical user. A general array of hash values, based on body movements by an average, or typical, user, may be obtained by recording movement patterns of the card while being carried by a representative sample of users and converting the movement patterns into hash values. The described second microprocessor may store hash values corresponding to patterns generated by behaviors of an average user while the user is in possession of transaction card. The behaviors may include routine movement. The movement may include locomotion. The movement may include walking. The movement may include running. The movement may include working. The movement may be selected from walking, running, and working. The movement may include other routine behaviors. The hash values may be stored as a set.

The second microprocessor may be configured to periodically compare a hash value from the third array of hash values to the values from the first and fifth arrays of hash values. The hash value from the third array of may be a recent value. In the case of a personalized first array, comparing the third array values to the first array values may assess whether the current card holder is believed to be a previously authorized and validated user. Sufficient similarity between a recently observed value from the third array and at least one value from the first array may be taken as evidence that the authorized user is in possession of the card. A recent value, in this context, may refer to one or more hash values converted from patterns observed over the last 2 minutes. A recent value may refer to value(s) converted from patterns from the last 3 minutes. A recent value may refer to value(s) converted from patterns from the last 5 minutes. A recent value may refer to value(s) converted from patterns from the last 10 minutes. A recent value may refer to value(s) converted from patterns from the last 20 minutes. The term may refer to value(s) corresponding to patterns observed over at least 2 minutes, at least 3 minutes, at least 5 minutes, at least 10 minutes, at least 20 minutes, or at least 30 minutes prior to the time of comparing the values from the third array of hash values to those from the first and fourth arrays.

Comparing the third array values to the fifth array values may assess whether the current card holder is performing a selected routine activity. The activity may include locomotion. The activity may include walking. The activity may include running. The activity may include working. The movement may be selected from walking, running, and working. The activity may include other routine behaviors. Sufficient similarity between a recently observed value from the third array and at least one value from the fifth array may be taken as evidence that the card holder is performing a routine activity. If the current card holder is assessed to be performing a routine activity, but the movement patterns do not match the stored motion patterns for that activity, the card may be assessed to be in the possession of a non-authorized user. The stored motion patterns for the observed activity may be those in the first array of hash values.

The second microprocessor may be configured to set a flag to be applied when the card is used at a point of sale. The use may be for a transaction. The flag may require an augmented authentication to be conducted before the transaction is approved. The flag may require an augmented authentication to be conducted before the payment is authorized. The flag may require an augmented authentication to be conducted before the performing system integration.

The flag may be based on a mismatch between the recent hash value from the third and all the hash values from the first array. The flag may be based on a match between the recent hash value from the third array and at least one value from the fifth array. Setting the flag may be predicated on meeting both of the following conditions: (a) a mismatch between the recent hash value from the third array and all the hash values from the first array; and (b) a match between the recent hash value from the third array and at least one value from the fifth array.

The first array of hash values may be not personalized for the transaction card's owner. The first array of hash values may be not specific to the transaction card's owner. The first array of hash values may be a general array of values reflecting routine movements of an average user. The first array of hash values may be a general array of values reflecting routine movements of a typical user. A general array of hash values, based on routine movements by an average, or typical, user, may be obtained by recording movement patterns of the card while carried by a representative sample of users and converting the movement patterns into hash values. The described second microprocessor may store hash values corresponding to patterns generated by behaviors of an average user while in possession of transaction card. The behaviors may include routine movement. The movement may include locomotion. The movement may include walking. The movement may include running. The movement may include working. The movement may be selected from walking, running, and working. The movement may include other routine behaviors. The hash values may be stored as a set.

The described second microprocessor may be the first microprocessor. A single microprocessor may be configured to perform the activities described herein for both the first and second microprocessors.

The described first sensor may include an accelerometer. The first sensor may include a gyroscope. The first sensor may include an accelerometer and a gyroscope.

The described second sensor may include an accelerometer. The second sensor may include a gyroscope. The second sensor may include an accelerometer and a gyroscope.

The described system may run real-time motion pattern analysis. The system may include a pattern registration platform. The platform may be disposed in the second microprocessor. The second microprocessor may convert movements into hashes. The second microprocessor may store the hashes. The second microprocessor may perform a comparison of a selected hash to a stored set of hashes. The second microprocessor may perform all of these activities.

The described card may be configured to interact with a transaction terminal. The card may be configured to exchange transaction information with the transaction terminal. The transaction terminal may include an interface for communication between transacting parties. The transaction terminal may be selected from a point-of-sale terminal and an automated teller machine.

Table 2 lists illustrative transaction information.

TABLE 2

Illustrative transaction information

Transaction instrument identification information (e.g., a card number, a MAC (media access control) address, an IP address)
Transaction instrument issuer information
(e.g., a bank issuer number ("BIN"))
Financial institution account information
Financial institution routing identification information
Transaction processing network identification information
Transaction amount information
Electronic Fund Transfer information
ACH information
Other suitable information Table 3 lists illustrative routine behaviors.

TABLE 3

Illustrative behaviors

Walking
Exercising
Driving
Working
Other suitable behaviors

In the distributed model, heavy processing may be performed at the, and light processing may be performed on on-board processors on the transaction instrument.

The described system may utilize card-based microprocessors as the edge layer of a computing network. The computing network may be configured to perform an activity described herein. The network may have a platform layer. The network may have an enterprise layer. The card-based microprocessors may be in communication with a data server in the platform layer. The card-based microprocessors may be in communication with an application server in the platform layer. Use of edge computing may enable the described systems and methods to monitor and require, when necessary, an enhanced authentication protocol for a card tapping transaction. The described systems and methods may perform this task in less than 2 seconds from the time of the attempted transaction. In some instances, the systems and methods may raise a flag requiring an enhanced authentication protocol prior to an attempted transaction.

In some embodiments, a machine-learning algorithm may be used to train the described card-based microprocessor to iteratively improve recognize card movements performed by an authorized user. The movements may be purposeful card movements relative to the body of the user. The movements may be movements of the body of the authorized user.

The aforementioned processing device or computer processor may be a computer, as described in more detail in FIG. 1, optionally including any of the components and elements described for FIG. 1.

Figure 2:
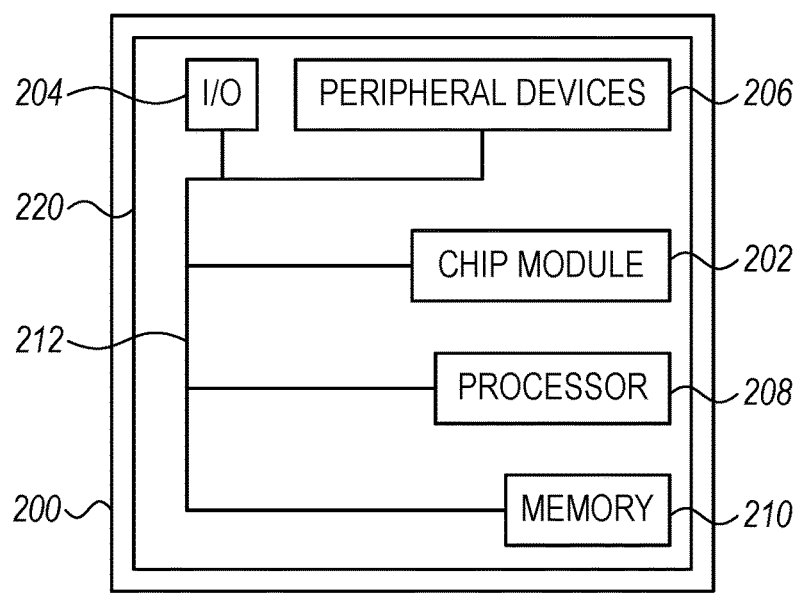
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may generate and store hash values, and compare stored hash values to hash values from observed motion.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as generating and storing hash values and comparing stored hash values to hash values from observed motion.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines, for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
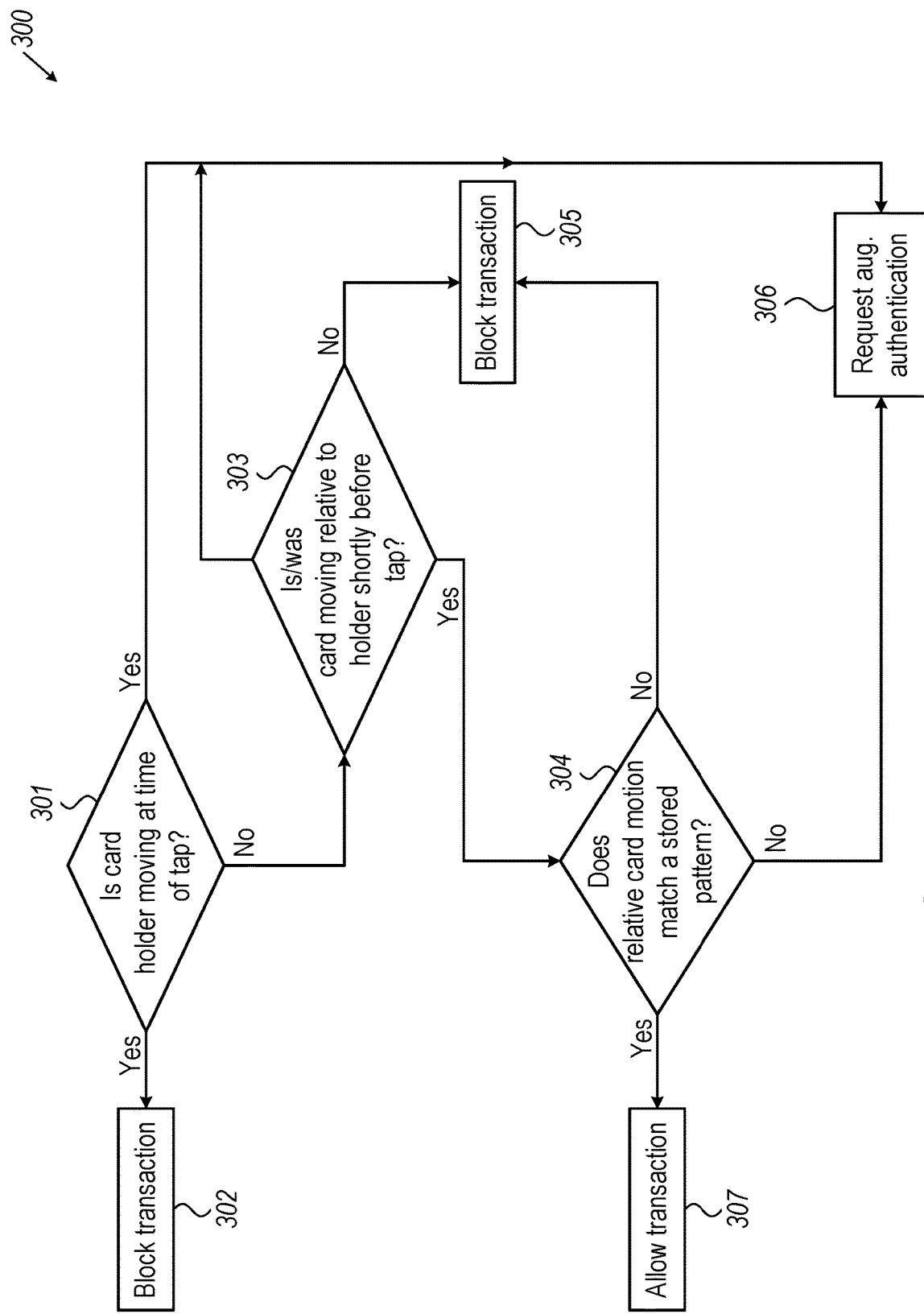
FIG. 3 is a flow diagram for a described method.

FIG. 3 provides a flow diagram for a described method 300 for determining whether a card tap was intentional by the card holder, in accordance with principles of the disclosure. At step 301, a disclosed apparatus or system determines whether a holder of a transaction card is in motion at the time the card is tapped. If yes, the transaction may be blocked (step 302), or augmented authentication may be required (step 306). In motion, in this context, refers to locomotion. The legs of the card holder may be moving. The torso of the card holder may be moving. Purposeful movement of the card by the holder is not considered locomotion. The assessment of whether the card holder was locomoting may be made by comparing the detected card motion pattern to a stored array of locomotion patterns.

If the card holder was not in motion at the time of tapping the card, the method may proceed to step 303. At steps 303-304, a disclosed apparatus or system assesses whether transaction card was moved relative to the holder (step 303), and if yes, whether the movement was in a purposeful fashion by the holder, shortly before the tap (step 304). If not, the transaction may be blocked (step 305), or an augmented authentication may be required (step 306). If yes, the transaction may be allowed (step 307), or an augmented authentication requirement may be waived. The assessment of whether the card was purposefully moved may be made by comparing the card motion pattern to a stored array of intentional card tapping patterns.

Figure 4A:
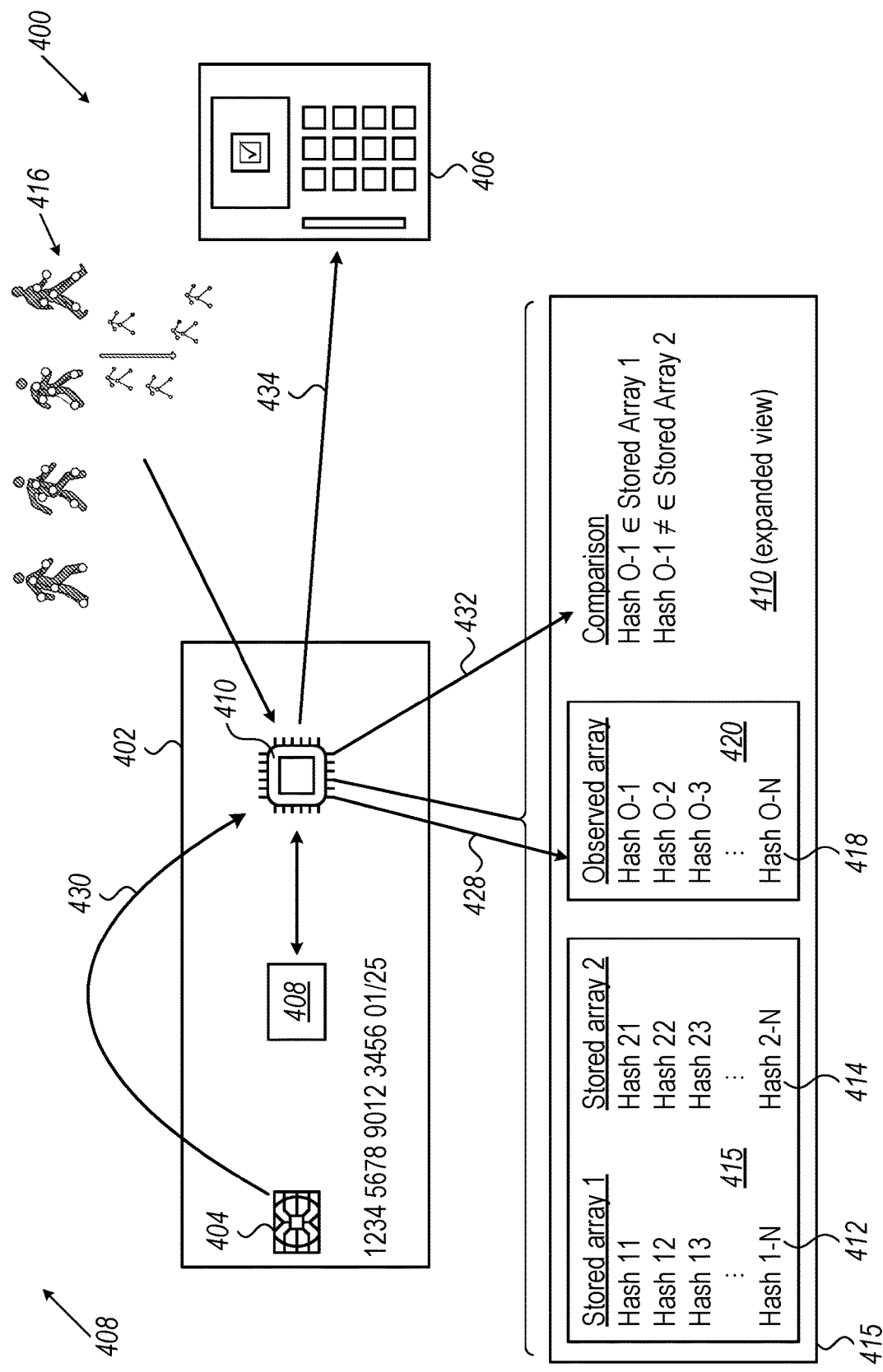
FIG. 4A is a simplified block diagram depicting an apparatus.
Figure 4B:
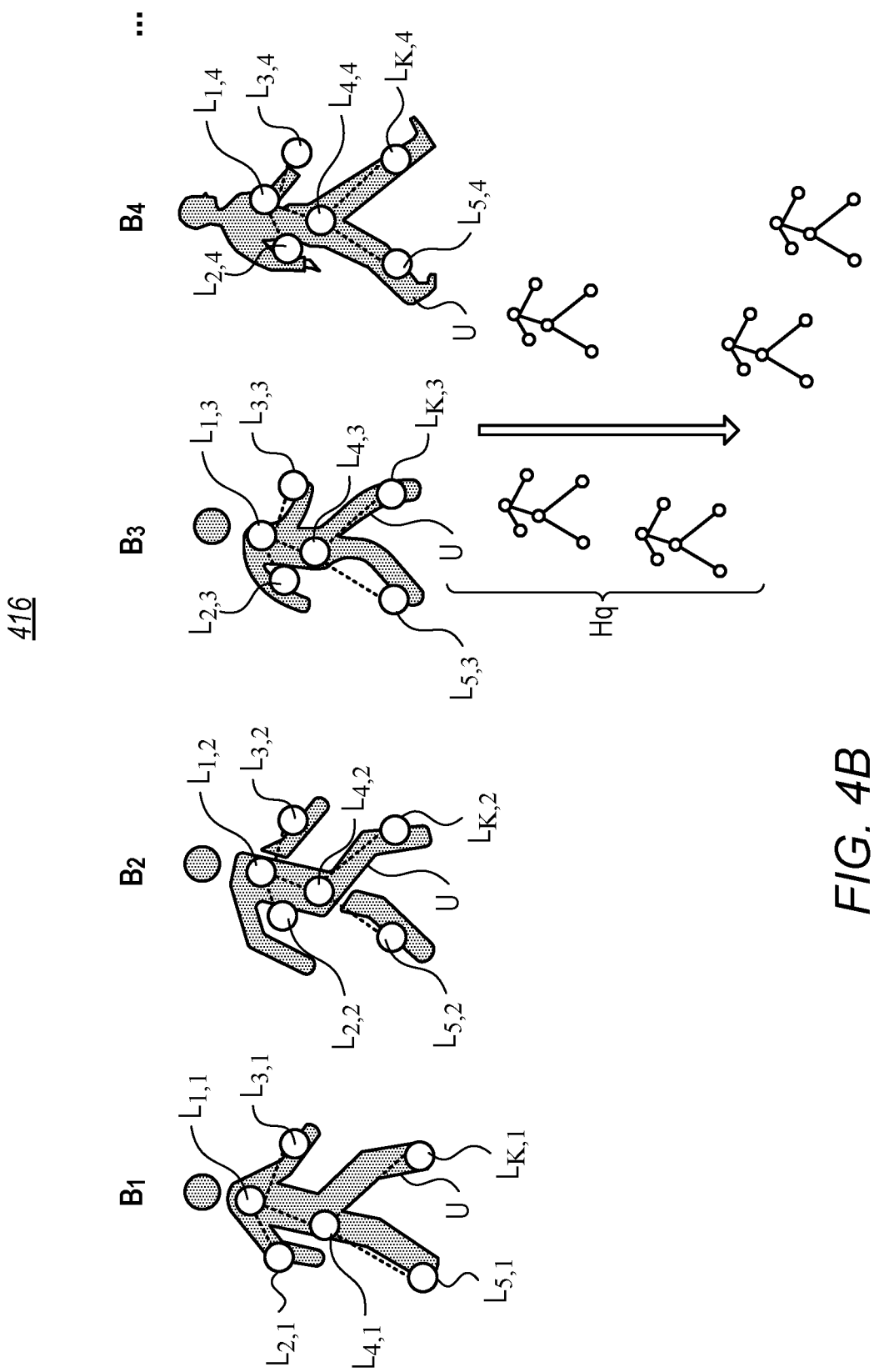
FIG. 4B is an expanded view of a series of observed patterns shown in FIG. 4A.

FIG. 4 is a simplified block diagram depicting an apparatus 400 for securing a transaction, in accordance with principles of the disclosure. The apparatus may contain a transaction card 402. The transaction card may contain a first microprocessor 404 configured to exchange transaction data to effect a transaction by engagement of the first microprocessor with a transacting party (represented as transaction terminal 406).

The transaction card may contain a sensor 408 configured to detect movement of the card.

The transaction card may contain a second microprocessor 410 in electrical communication with the sensor, the second microprocessor being configured to store a first array 412 of hash values and a second array 414 of hash values, wherein the first array of hash values represents a movement of a user (not shown) in possession of the transaction card; and the second array of hash values represents a purposeful movement of the transaction card relative to the user. The storage may be in a machine-readable memory 415 of the second microprocessor.

The second microprocessor may be configured to derive a series 416 of observed patterns, each pattern associated with an observation time range and based on a transformation of a time series of signals output by the sensor. The transformation may be based on a relationship between the time series and a measurement of a parameter selected from acceleration and angular orientation. The transformation may be based on the disposition of the card at a location on a user body during the activity. The patterns may be derived during a set of activities.

The second microprocessor may be configured to convert the observed patterns into a third array 418 of hash values. In storing mode 800, a user may engage in behaviors $B_{1,i}=1 \ldots N$. Each pattern may be defined based on a single behavior and a single location. A pattern may be defined based on a single behavior and multiple locations. A pattern may be defined based on multiple behaviors and a single location. A pattern may be defined based on a multiple behaviors and multiple locations.

For each pattern, transaction instrument 602 may generate a hash value Hq.

At arrow 428, the second microprocessor may be configured to hold the third array of hash values or a recent subset thereof in a working memory 420 of the second microprocessor.

At arrow 430, the second microprocessor may be configured to register a request from the first microprocessor to effect a requested transaction and a corresponding transaction request time.

At arrow 432, the second microprocessor may be configured to identify a contemporaneous hash value (hash O-1, in the depicted case) from the third array of hash values, the contemporaneous hash value being contemporaneous with the transaction request time; and compare in real time the contemporaneous hash value to hash values from the first and second array.

At arrow 434, the second microprocessor may be configured to require an augmented authentication for the requested transaction, based on at least one of the following conditions: (a) the contemporaneous hash value matches a hash value from the first array; or (b) the contemporaneous hash value does not match any of the hash values in the second array.

Figure 5:
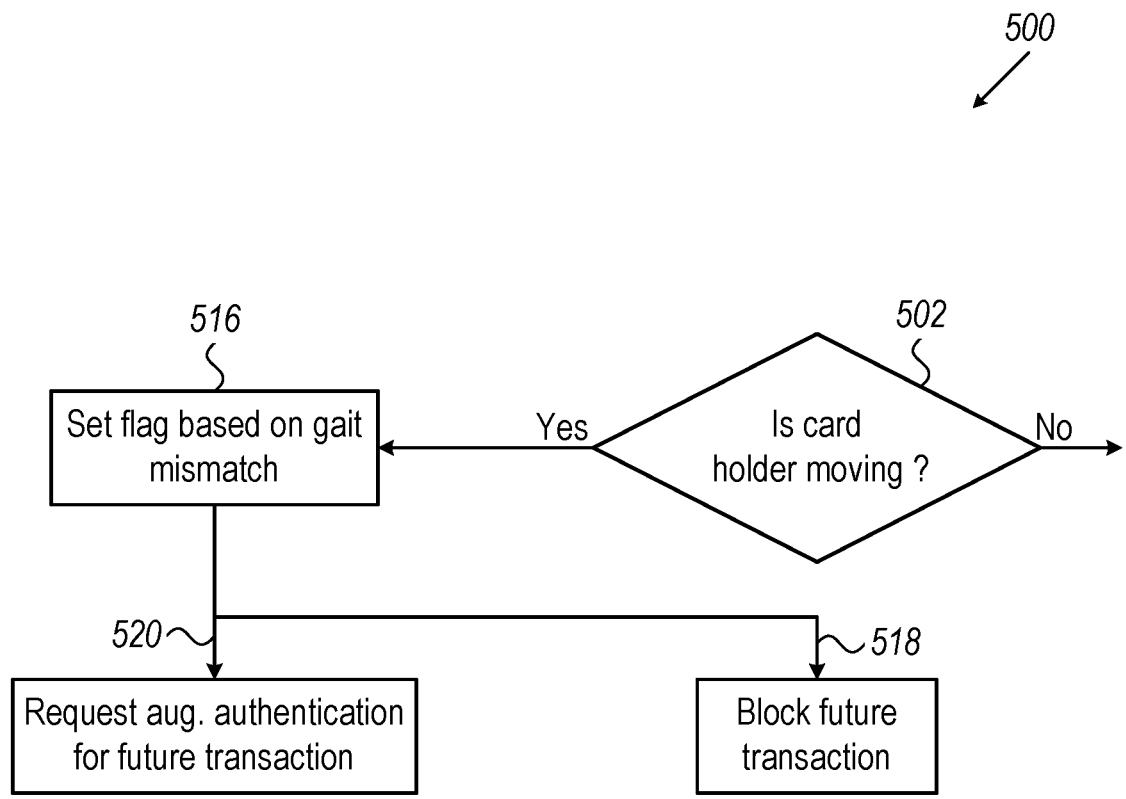
FIG. 5 is a flow diagram for a described method.

FIG. 5 provides a flow diagram for a described method 500 for determining whether a card tap was intentional by the card holder, in accordance with principles of the disclosure. In addition to steps 301-307, described for FIG. 3 and not shown in FIG. 5, gait mismatching may be used to determine whether a different person, for example a thief, is carrying the transaction card. Gait mismatching may be assessed at any time. Gait mismatching may be assessed proactively, for example before a transaction is attempted. At step 502, a disclosed apparatus or system determines (a) whether a holder of a transaction card is in motion; and (b) if yes, whether the gait matches the known gait of the card holder. A first set of stored locomotion patterns may be customized to the card owner's gait. A second set of stored locomotion patterns may be general locomotion patterns. An observed locomotion pattern matching pattern(s) from the second set, but not from the first set, may indicate that the card is being carried by a person other than the rightful owner.

At step 516, if the card is perceived as being carried by a different person, a flag is set for future transactions. At step 518, the flag may result in blocking a future transaction. At step 520, the flag may result in requiring augmented authentication for a future transaction Steps 516, 518, and 520 may be performed periodically, regardless of whether a transaction request is registered by the second microprocessor. If no flag is detected at the time of registering a transaction request, steps 301-307 may then be performed to provide further security to the transaction request.

Determining whether the card appears to be carried by a different person may be performed by periodically comparing card motion information to a first database of stored general locomotion patterns and a second database of stored patterns corresponding to the card owner's gait. Card motion (a) in a general locomotion pattern that (b) does not correspond to the card owner's gait may cause a determination that the card is being carried by a different person than the card owner.

Figure 6:
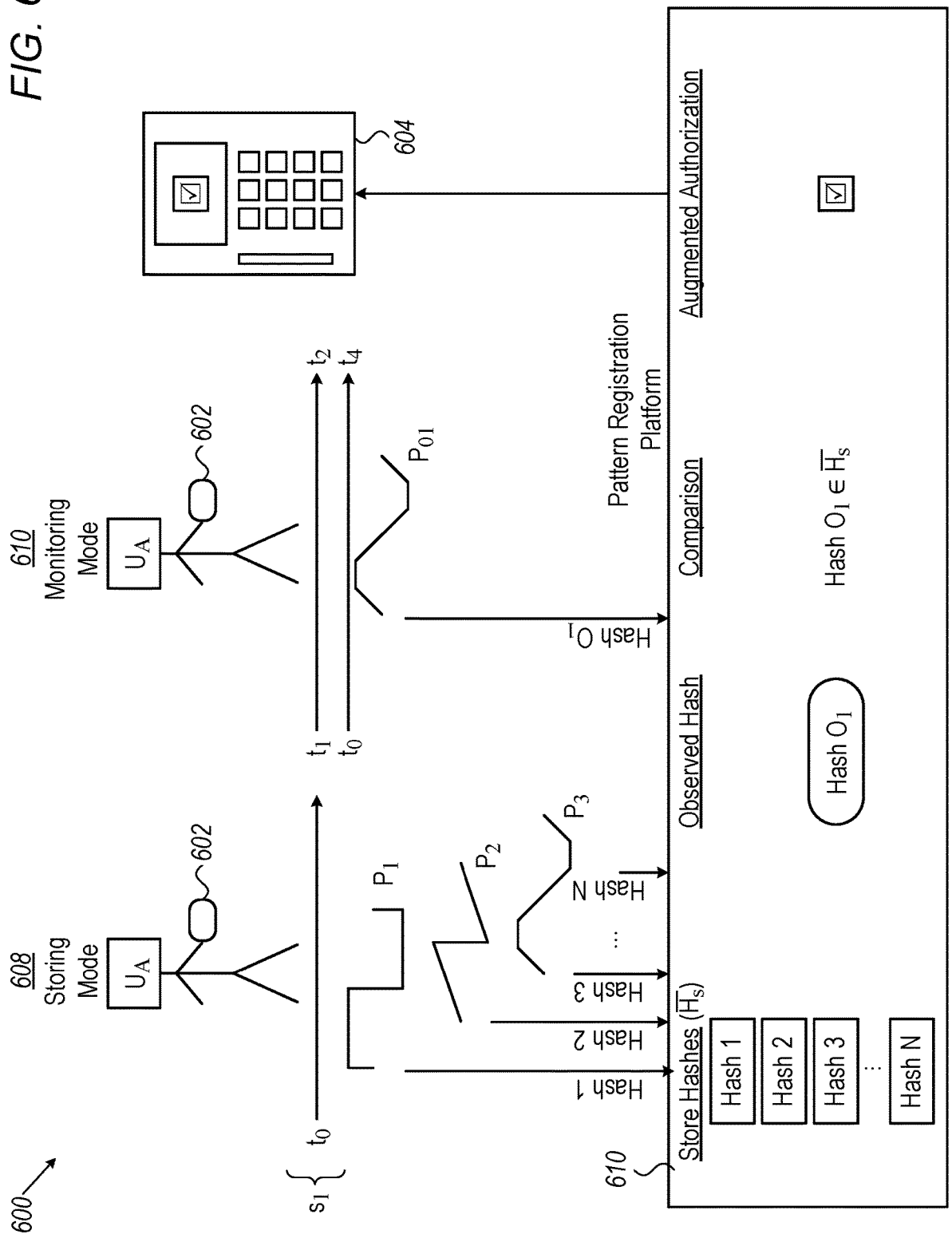
FIG. 6 shows an illustrative architecture for securing a transaction.

FIG. 6 shows illustrative architecture 600 for securing a transaction. Architecture 600 may include transaction card 602. Architecture 600 may include transaction terminal 604. Architecture 600 may include second microprocessor 410 (described in FIG. 4). Architecture 600 may provide storing mode 608. Architecture 600 may provide monitoring mode 608.

In storing mode 608, second microprocessor 410 may store hash values corresponding to patterns generated by behaviors of authorized user UA while authorized user UA is in possession of transaction card 602. Second microprocessor 410 may utilize machine readable memory to store hash values.

In monitoring mode 610, second microprocessor 410 may store hash values corresponding to patterns generated by behaviors of authorized user UA while authorized user UA is in possession of transaction card 602. In monitoring mode 610, second microprocessor 410 may store hash values corresponding to patterns generated by behaviors of unauthorized user $U_U$ while unauthorized user $U_U$ is in possession of transaction card 602.

If a user presents transaction card 602 to transaction device 604, second microprocessor 410 may compare recently observed hash patterns to stored hash patterns. If, in monitoring mode 610, second microprocessor 410 detects a pattern that does not correspond to a pattern stored during storing mode 608, second microprocessor 410 may require augmented authorization to perform the transaction. Second microprocessor may periodically compare recently observed hash patterns to stored hash patterns, regardless of whether transactions are being attempted with the card. If second microprocessor 410 detects a pattern that does not correspond to a pattern stored during storing mode 608, second microprocessor 410 may set a flag that requires augmented authentication for future transactions.

FIG. 6 shows illustrative time periods t0-to1, t1-t2 and t3-t4. Period t0-t1 may correspond to storing mode 608. Periods t1-t2 and t3-t4 may correspond to monitoring mode 610. During all the periods, transaction card 602 may be in the possession of authorized user UA.

During period t0-t1, user UA may perform a series of behaviors. Transaction card 602 may sense one or more patterns such as patterns P1, P2, P3, . . . , PN. Transaction card 602 may convert each of the patterns into a hash value, such as corresponding hash values hash 1, hash 2, hash 3, . . . , hash N. Second microprocessor 410 may store the N hash values as an array HS of stored hash values.

User UA may set transaction card 602 to monitor mode 610. In one or both of periods t1-t2 or t3-t4, transaction card 602 may sense one or more patterns such as first observed pattern PO1. First observed pattern PO1 may be inherently linked to the identity of user UA, because it corresponds to the behavior of user UA.

As depicted, hash value HO1 corresponds to first observed pattern PO1. Second microprocessor 410 may perform a comparison and recognize that first observed hash value HO1 is a member of array HS (HO1∈HS). Second microprocessor 410 may thus not set a flag requiring augmented authorization.

In a different scenario (not shown), during one or both of periods t1-t2 or t3-t4, unauthorized user UU gains possession of transaction card 602. Second microprocessor 410 may sense one or more patterns such as second observed pattern PO2. Second observed pattern PO2 may be inherently different from any pattern that is linked to the identity of user UA, because pattern PO2 corresponds to the behavior of user UU.

Second microprocessor 410 may generate second observed hash value HO2, which may correspond to second observed pattern PO2. Pattern registration platform 306 may perform a comparison and recognize that second observed hash value HO2 is not a member of array HS (HO2∉HS). Second microprocessor 410 may thus set a flag requiring augmented authorization.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from secondary authorization steps, and it is trained to use data from attempted transactions to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for securing transactions are provided. Persons skilled in the art will appreciate that the present invention can be practiced by other than the described embodiments, which are presented for purposes of illustration rather than of limitation.

What is claimed is:

1. A system for securing a transaction, the system comprising a first sensor and a transaction card comprising a second sensor, wherein:
    the first sensor, mounted on a mobile computing device, is external to the transaction card;
    the first sensor is configured to detect a movement of a person in possession of the card; the second sensor is configured to detect a movement of the transaction card; the transaction card further comprises:
        a first microprocessor, trained by a machine-learning algorithm, configured to exchange transaction data to effect a transaction by engagement of the first microprocessor with a transacting party, the first microprocessor being a card-based microprocessor;
        a second microprocessor, trained by a machine-learning algorithm, in electrical communication with the first and second sensors, the second microprocessor being a card-based microprocessor, the second microprocessor including a pattern registration platform, the second microprocessor configured to:
        store a first and second array of reference hash values, wherein:
            the first array of reference hash values represents reference body movements; and
            the second array of reference hash values represents reference relative card movements;
        derive from the first sensor a series of observed body movement patterns, each pattern associated with an observation time range and based on
            (a) a transformation of a time series of signals output by the first sensor, the transformation based on a relationship between the time series and a measurement of a parameter selected from acceleration and angular orientation; and
            (b) the disposition of the first sensor at a location on the person; derive from the second sensor a series of observed card movement patterns, each pattern associated with an observation time range and based on
(a) a transformation of a time series of signals output by the second sensor, the transformation based on a relationship between the time series and a measurement of a parameter selected from acceleration and angular orientation; and
(b) the disposition of the second sensor at a location on the card;

compare the series of observed card movement patterns to contemporaneous observed patterns from the series of observed body movement patterns to thereby derive a series of observed relative card movement patterns, the relative card movement patterns being relative to the person;

convert the series of observed body movement patterns into a third array of hash values;

convert the series of observed relative card movement patterns into a fourth array of hash values;

store the third and fourth arrays of hash values or a subset thereof in a working memory;

register a request from the first microprocessor to effect a requested transaction and a corresponding transaction request time;

identify a first contemporaneous hash value from the third array of hash values, the first contemporaneous hash value being contemporaneous with the transaction request time;

identify a second contemporaneous hash value from the fourth array of hash values, the second contemporaneous hash value being contemporaneous with the transaction request time;

determine in real time whether the first contemporaneous hash value matches a hash value from the first array; and determine in real time whether the second contemporaneous hash value matches a hash value from the second array; and perform an augmented authentication for the requested transaction, the augmented authentication comprising an additional authentication not included in the requested transaction to prevent system integration before the additional authentication is completed, based on at least one of the following conditions:

the first contemporaneous hash value matches a hash value from the first array; or the second contemporaneous hash value does not match any of the hash values in the second array;

wherein, when the augmented authentication is successful, the augmented authentication further comprises, using edge processing, permitting the transaction; and wherein, when the augmented authentication is not successful, the augmented authentication further comprises, using edge processing, blocking the transaction.

2. The system of claim 1, wherein the second array of hash values is personalized for the transaction card's owner.

3. The system of claim 1, wherein the second array of hash values is not personalized for the transaction card's owner.

4. The system of claim 1, wherein the first array of hash values is personalized for the transaction card's owner.

5. The system of claim 4, wherein the second microprocessor is further configured to:

store a fifth array of hash values, wherein the fifth array of hash values represents a body movement of a user other than the owner;

periodically compare a recent hash value from the third array of hash values to the values from the first and fifth arrays of hash values; and set a flag to be applied when the card is used at a point of sale, the flag requiring an augmented authentication, wherein the flag is based on the following conditions:

the recent hash value from the third array does not match any of the hash values from the first array; and the recent hash value from the third array matches a value from the fifth array.

6. The system of claim 1, wherein the first array of hash values is not personalized for the transaction card's owner.

7. The system of claim 1, wherein the second microprocessor is the first microprocessor.

8. The system of claim 1, wherein the first sensor comprises an accelerometer or a gyroscope.

9. The system of claim 1, wherein the second sensor comprises an accelerometer or a gyroscope.

10. The system of claim 1, wherein the second sensor comprises an accelerometer and a gyroscope.

* * * * *